United States Patent
Zhang et al.

(10) Patent No.: US 11,050,864 B2
(45) Date of Patent: Jun. 29, 2021

(54) SLIDING STRUCTURE AND TERMINAL

(71) Applicant: Honor Device Co., Ltd., Shenzhen (CN)

(72) Inventors: Yaolei Zhang, Beijing (CN); Zhengping Tan, Beijing (CN); Jianhong Luo, Shenzhen (CN); Qiang Huang, Shenzhen (CN); Leibo Yuan, Shenzhen (CN); Wei Zhang, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 16/979,659

(22) PCT Filed: Oct. 31, 2018

(86) PCT No.: PCT/CN2018/113164
§ 371 (c)(1),
(2) Date: Sep. 10, 2020

(87) PCT Pub. No.: WO2019/174258
PCT Pub. Date: Sep. 19, 2019

(65) Prior Publication Data
US 2021/0029230 A1    Jan. 28, 2021

(30) Foreign Application Priority Data
Mar. 12, 2018  (WO) ................ PCT/CN2018/078739

(51) Int. Cl.
*H04M 1/00* (2006.01)
*H04M 1/02* (2006.01)

(52) U.S. Cl.
CPC ....... *H04M 1/0237* (2013.01); *H04M 1/0262* (2013.01); *H04M 1/0266* (2013.01); *H04M 1/0277* (2013.01)

(58) Field of Classification Search
CPC ............. H04M 1/0237; H04M 1/0262; H04M 1/0266; H04M 1/0277
See application file for complete search history.

(56) References Cited

U.S. PATENT DOCUMENTS

| 7,532,169 | B2 * | 5/2009 | Joo ..................... H04M 1/0237 343/702 |
| 7,646,866 | B2 * | 1/2010 | Lin ..................... H04M 1/0237 379/433.12 |

(Continued)

FOREIGN PATENT DOCUMENTS

| CN | 101115082 A | 1/2008 |
| CN | 201018544 Y | 2/2008 |

(Continued)

*Primary Examiner* — Nhan T Le
(74) *Attorney, Agent, or Firm* — Conley Rose, P.C.

(57) ABSTRACT

A sliding structure includes an upper substrate and a lower substrate. Two first slide grooves are disposed at a first end of the upper substrate, and the two first slide grooves are disposed opposite to each other. Two first slide rails are disposed at a first end of the lower substrate, and the two first slide rails are disposed opposite to each other. The two first slide rails are respectively assembled in the two first slide grooves. Two second slide rails are disposed at a second end of the upper substrate, and the two second slide rails are disposed opposite to each other. Two second slide grooves are disposed at a second end of the lower substrate, and the two second slide grooves are disposed opposite to each other. The two second slide rails are respectively assembled in the two second slide grooves.

20 Claims, 15 Drawing Sheets

(56) References Cited

U.S. PATENT DOCUMENTS

| | | | |
|---|---|---|---|
| 8,121,659 B2* | 2/2012 | Vesamaki | H04M 1/0237 |
| | | | 455/575.4 |
| 9,848,506 B2* | 12/2017 | Zhang | H05K 7/1061 |
| 2010/0124955 A1* | 5/2010 | Lin | H04M 1/0237 |
| | | | 455/575.4 |
| 2011/0234069 A1 | 9/2011 | Chen et al. | |
| 2011/0319140 A1 | 12/2011 | Kanbe | |
| 2012/0100893 A1 | 4/2012 | Jung | |

FOREIGN PATENT DOCUMENTS

| | | |
|---|---|---|
| CN | 201039241 Y | 3/2008 |
| CN | 201167440 Y | 12/2008 |
| CN | 101742867 A | 6/2010 |
| CN | 201657047 U | 11/2010 |
| CN | 201682533 U | 12/2010 |
| CN | 102082840 A | 6/2011 |
| CN | 201910838 U | 7/2011 |
| CN | 201957072 U | 8/2011 |
| CN | 102209446 A | 10/2011 |
| CN | 202043151 U | 11/2011 |
| CN | 103124301 A | 5/2013 |
| CN | 110138916 A | 8/2019 |
| EP | 1970793 A1 | 9/2008 |
| KR | 20080095070 A | 10/2008 |
| KR | 20130092037 A | 8/2013 |
| WO | 03017245 A1 | 2/2003 |

\* cited by examiner

SLIDING STRUCTURE AND TERMINAL

CROSS-REFERENCE TO RELATED APPLICATIONS

This application is a national stage of International Application No. PCT/CN2018/113164, filed on Oct. 31, 2018, which claims priority to International Application No. PCT/CN2018/078739, filed on Mar. 12, 2018. Both of the aforementioned applications are hereby incorporated by reference in their entireties.

TECHNICAL FIELD

Embodiments of the present invention relate to a terminal, and in particular, to a sliding structure and a terminal.

BACKGROUND

A slide rail is a widely used mechanical moving part. A device can be opened or closed by using the slide rail. A conventional slide phone may include a sliding structure. FIG. 1 is a schematic diagram of an existing slide phone 100. As shown in FIG. 1, an upper part and a lower part of a mobile phone may slide relative to each other by using a sliding structure. When the upper part 120 and the lower part 140 slide to open, a keyboard may be exposed for use by a user. The sliding structure is usually formed by a slide rail and a slide groove. For example, the upper part 120 includes the slide rail, and the lower part 140 includes the slide groove. Alternatively, the upper part 120 includes the slide groove, and the lower part 140 includes the slide rail.

However, an existing slide phone is generally small but thick, and has a long slide rail stroke and a low requirement for precision. Therefore, the existing sliding structure cannot be used for a large screen, a large-sized mobile phone, or another electronic device.

SUMMARY

Embodiments of the present invention provide a sliding structure and a terminal, which are applicable to a large-sized electronic device.

According to a first aspect, in an embodiment of the present invention, a sliding structure 30 is provided, including an upper substrate 32 and a lower substrate 34. Two first slide grooves 321 are disposed at a first end of the upper substrate 32, and the two first slide grooves 321 are disposed opposite to each other, to be specific, one slide groove 321 is located on one side of the upper substrate 32, and the other slide groove 321 is located on the other opposite side. Two second slide rails 323 are disposed at a second end of the upper substrate 32, and the two second slide rails 323 are disposed opposite to each other, to be specific, the two second slide rails 323 may be respectively located on two opposite sides of the upper substrate. Two first slide rails 341 are disposed at a first end of the lower substrate 34, and the two first slide rails 341 are disposed opposite to each other. Two second slide grooves 343 are disposed at a second end of the lower substrate 34, and the two second slide grooves 343 are disposed opposite to each other. Similarly, the two first slide rails 341 are respectively located on two sides of the lower substrate 341, and the two second slide grooves 343 are also respectively located on the two sides of the lower substrate 341.

After the upper substrate 32 and the lower substrate 34 are assembled together, the two first slide rails 341 are respectively assembled in the two first slide grooves 321, and the two second slide rails 323 are respectively assembled in the two second slide grooves 343. The first slide rail 341 can slide in cooperation with the first slide groove 321, and the second slide rail 323 can slide in cooperation with the second slide groove 343. Therefore, the upper substrate 32 and the lower substrate 34 can slide relative to each other.

Optionally, in addition to the first slide groove 321 and the second slide rail 323, the upper substrate 32 may further include another slide groove or slide rail. In addition to the second slide groove 343 and the first slide rail 341, the lower substrate 34 may further include other slide rails or slide grooves that cooperate with the upper substrate 32, so that the upper substrate can slide relative to the lower substrate. When the upper substrate slides relative to the lower substrate, the lower substrate also slides relative to the upper substrate.

Optionally, there is a spacing between the first slide groove 321 and the second slide rail 323 that are located on a same side of the upper substrate 32. In other words, the first slide groove 321 and the second slide rail 323 that are located on the same side may not be in contact.

Optionally, there is a spacing between the second slide groove 343 and the first slide rail 341 that are located on a same side of the lower substrate 34. The second slide groove 343 and the first slide rail 341 that are located on the same side may not be in contact.

The sliding structure generally needs to be used in a terminal. Different sliding structures may be disposed based on structures and spatial layouts of other components in the terminal. Optionally, the first end of the upper substrate 32 is a position close to a bottom of the upper substrate 32, and the second end of the upper substrate 32 is a position close to a top of the upper substrate 32. The first end of the lower substrate 34 is a position close to a bottom of the lower substrate 34, and the second end of the lower substrate 34 is a position close to a top of the lower substrate 34. Optionally, the first end of the upper substrate 32 is a position close to a top of the upper substrate 32, and the second end of the upper substrate 32 is a position close to a bottom of the upper substrate 32. The first end of the lower substrate 34 is a position close to a top of the lower substrate 34, and the second end of the lower substrate 34 is a position close to a bottom of the lower substrate 34. The bottom of the upper substrate or the bottom of the lower substrate is a position close to a bottom of the terminal and away from a top of the terminal. The top of the upper substrate or the top of the lower substrate is a position close to the top of the terminal and away from the bottom of the terminal.

Optionally, a length of the first slide groove 321 may be greater than, equal to, or less than a length of the second slide groove 343.

Optionally, a length of the first slide groove 321 may be greater than, equal to, or less than a length of the second slide rail 323.

Further, the sliding structure 30 may further include two springs 347 that are symmetrically disposed. A first connection end 3471 of the spring 347 is fastened to the lower substrate 34, and a second connection end 3472 of the spring 347 is fastened to the upper substrate 32. The connection may be performed in a fastening manner such as riveting, welding, or screwing. Optionally, the spring 347 is electrically conductive, and the upper substrate and the lower substrate may be electrically conductive by using the spring. The two springs that are symmetrically disposed can counteract a transverse force of each other, so that the upper substrate and the lower substrate are more secure when sliding relative to each other.

Optionally, the spring 347 is always in a compressed state. In a process in which the upper substrate 32 starts to slide or stop sliding relative to the lower substrate 34, the spring 347 may always be in the compressed state. Alternatively, based on a structure of the terminal and an attribute of the spring, in another manner, the spring 347 may alternatively be set to be in a stretched state.

Further, m spring sheets 349 may be disposed on the lower substrate 34, where m≥1. Correspondingly, in holes 327 are disposed on the upper substrate 32, and a first metal pad 3271 and a second metal pad 3272 are respectively disposed at two ends of each hole 327. Each spring sheet corresponds to one hole, in other words, the in spring sheets 349 are in a one-one correspondence with the m holes, Correspondingly, each spring sheet corresponds to the first metal pad 3271 and the second metal pad 3272 that are disposed at the two ends of each hole. In a process in which the upper substrate 32 slides relative to the lower substrate 34, each spring sheet 349 slides in a corresponding hole 327. When the upper substrate 32 is located at a start position of sliding relative to the lower substrate 34, each spring sheet 349 is in contact with the second metal pad 3272 in the corresponding hole 327. When the upper substrate 32 is located at an end position of sliding relative to the lower substrate 34, each spring sheet 349 is in contact with the first metal pad 3271 in the corresponding hole 327.

Optionally, the spring sheet 349, the first metal pad 3271, and the second metal pad 3272 are electrically conductive. The upper substrate 32 and the lower substrate 34 can be electrically conducted by using the spring sheet 349, the first metal pad 3271, and the second metal pad 3272.

According to a second aspect, in an embodiment of the present invention, a terminal is provided, including an upper slider, a lower slider, and any sliding structure 30 provided in the first aspect. An upper substrate 32 in the sliding structure 30 is fastened to the upper slider. A lower substrate 34 in the sliding structure 30 is fastened to the lower slider. The upper slider and the lower slider can slide relative to each other by using the sliding structure.

Based on an internal composition of the terminal and a spatial structure of each component, in different implementations, the upper slider and the lower slider may include different components.

Optionally, the upper slider includes a display module 10 and a front housing 20. The display module 10 is fixedly assembled with the front housing 20, and the front housing 20 is fastened to the upper substrate 32. The lower slider includes a rear housing 40, and the rear housing 40 is fastened to the lower substrate 34. Optionally, the lower slider further includes a mainboard 50, a battery 60, and a housing. The rear housing 40, the mainboard 50, the battery 60, and the housing are fixedly assembled.

Optionally, one or more of a mainboard 50 and a battery 60 may be included in the upper slider, but not included in the lower slider. If the upper slider includes the mainboard 50, the display module 10, the mainboard 50, and the front housing 20 may be fixedly assembled. If the upper slider includes the battery 60, the display module 10, the battery 60, and the front housing 20 may be fixedly assembled. If the upper slider includes the mainboard 50 and the battery 60, the display module 10, the mainboard 50, the front housing 20, and the battery 60 may be fixedly assembled.

Optionally, when the terminal is in an initial state, the upper slider and the lower slider are closed. In an implementation, in an initial state, the upper slider can slide downward relative to the lower slider. In another implementation, in an initial state, the upper slider can slide upward relative to the lower slider. The "upward" and "downward" generally refers to an upward direction and a downward direction of the terminal in a scenario in which the terminal is handheld by a user and is normally used.

Further, the terminal may further include an auxiliary slide rail 80. The auxiliary slide rail 80 is fastened between the upper slider and the lower slider. By using the auxiliary slide rail 80 and the sliding structure 30, the upper slider and the lower slider can slide relatively.

The auxiliary slide rail 80 includes a slide component 801 and a slide groove component 803, and the slide component 801 can slide relative to the slide groove component 803.

Optionally, the slide component 801 may be fastened to the upper slider. Specifically, the slide component 801 may be fastened to the front housing 20 in the upper slider. The slide groove component 803 is fastened to the lower slider. Specifically, the slide groove component 803 is fastened to the rear housing 40 in the lower slider.

Optionally, the slide component 801 is fastened to the lower slider. Specifically, the slide component 801 may be fastened to the rear housing 40 in the lower slider. The slide groove component 803 is fastened to the upper slider. Specifically, the slide groove component 803 is fastened to the front housing 20 in the upper slider.

The slide groove component 803 has a slide groove 8034, for example, a long strip shape or a straight shape. When the upper slider and the lower slider slide relative to each other, the slide component 801 can slide in the slide groove 8034.

In a solution in which the slide component 801 is fastened to the upper slider, the slide component 801 is fastened to the upper slider by using the slide groove 8034.

In a solution in which the slide component 801 is fastened to the lower slider, the slide component 801 is fastened to the lower slider by using the slide groove 8034.

Optionally, the slide component 801 is a screw. A surface of the slide groove component 803 is smooth. A material of the slide move component 803 may be, for example, a polyoxymethylene (POM) material.

Optionally, the sliding structure 30 does not overlap or intersect the auxiliary slide rail 80. For example, the sliding structure 30 is close to a bottom of the terminal, and the auxiliary slide rail 80 is close to a top of the terminal. Alternatively, the sliding structure 30 is close to a top of the terminal, and the auxiliary slide rail 80 is close to a bottom of the terminal.

According to the sliding structure provided in this embodiment of the present invention, the upper substrate is provided with the first slide groove and the second slide rail, and the lower substrate is provided with the first slide rail and the second slide groove. To be specific, some of the slide rails required for sliding are disposed on the upper substrate, and some of the slide rails required for sliding are disposed on the lower substrate. Correspondingly, some of the slide grooves required for sliding are disposed on the upper substrate, and some of the slide grooves required for sliding are disposed on the lower substrate. However, for a large-sized terminal, to make the structure of the terminal secure, a plurality of fastening components such as screws are usually used to fasten and connect the upper substrate and the lower substrate to another component in the terminal. If only a very long slide groove is disposed on the upper substrate, and only a very long slide rail is disposed on the lower substrate, the fastening component in the terminal is likely to block sliding of the upper substrate and the lower substrate. However, the sliding structure with two segments or a plurality of segments provided in this embodiment of the present invention can avoid impact of the fastening components on sliding, so that the sliding structure can be well applied to a large-sized or large-screen terminal. In addition, by further disposing the auxiliary slide rail in the terminal, it can be ensured that in a sliding process of the upper slider and the lower slider of the terminal, a gap between the two sliders is small and even.

DESCRIPTION OF EMBODIMENTS

Figure 1:
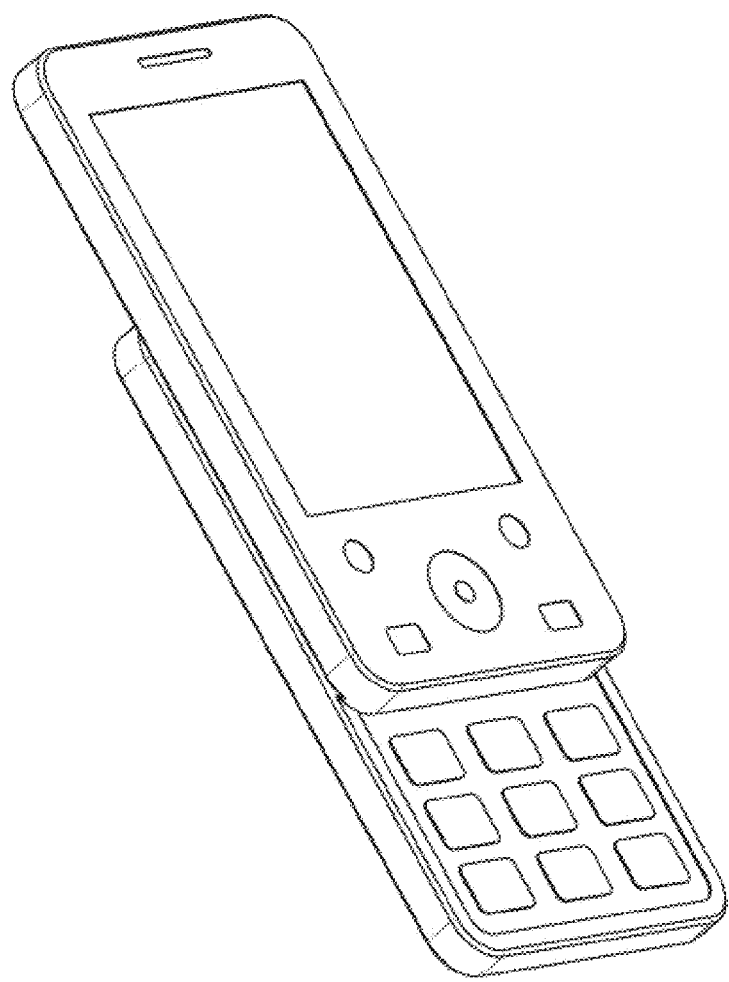
FIG. 1 is a schematic diagram of an existing slide phone.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

The sliding structure provided in the embodiments of the present invention may be included in a terminal. By using the sliding structure, a part of the terminal can slide relative to another part of the terminal. The terminal may be, for example, a mobile phone, a tablet computer (Tablet Personal Computer), a digital camera, a personal digital assistant (personal digital assistant, PDA for short), a navigation apparatus, a mobile Internet device (Mobile Internet Device, MID), or a wearable device (Wearable Device).

Currently, a screen size of a terminal such as a mobile phone or a tablet computer is generally relatively large. However, to ensure portability of the terminal, a size of the terminal needs to be controlled as much as possible while a large screen is implemented, in other words, a screen-to-body ratio (a ratio of a screen area to a front panel area of the terminal) of the terminal needs to be increased as much as possible. The terminal provided in this embodiment of this application includes an upper slider and a lower slider that can slide relative to each other. From a perspective of a front side of the terminal, the upper slider is located above the lower slider. In an initial state, the upper slider and the lower slider completely or partially overlap. In a sliding-open state, the upper slider and the lower slider partially overlap. An overlapping area of this part is less than an overlapping area in the initial state. The upper slider can slide downward or upward relative to the lower slider. For example, in the initial state, the upper slider can slide downward relative to the lower slider. After the upper slider slides downward, the terminal is in the sliding-open state. In the sliding-open state, the upper slider can slide upward to restore to the initial state. Alternatively, in the initial state, the upper slider can slide upward relative to the lower slider. After the upper slider slides upward, the terminal is in the sliding-open state. In the sliding-open state, the upper slider can slide downward to restore to the initial state. Alternatively, in the initial state, the upper slider can slide upward relative to the lower slider, can slide downward relative to the lower slider, and can slide to restore to the initial state. The upper slider and the lower slider slide relative to each other by using the sliding structure in the terminal. In other words, the terminal includes the upper slider and the lower slider, and the sliding structure. A part of the sliding structure may be fastened to the upper slider, and another part of the sliding structure may be fastened to the lower slider.

Figure 2:
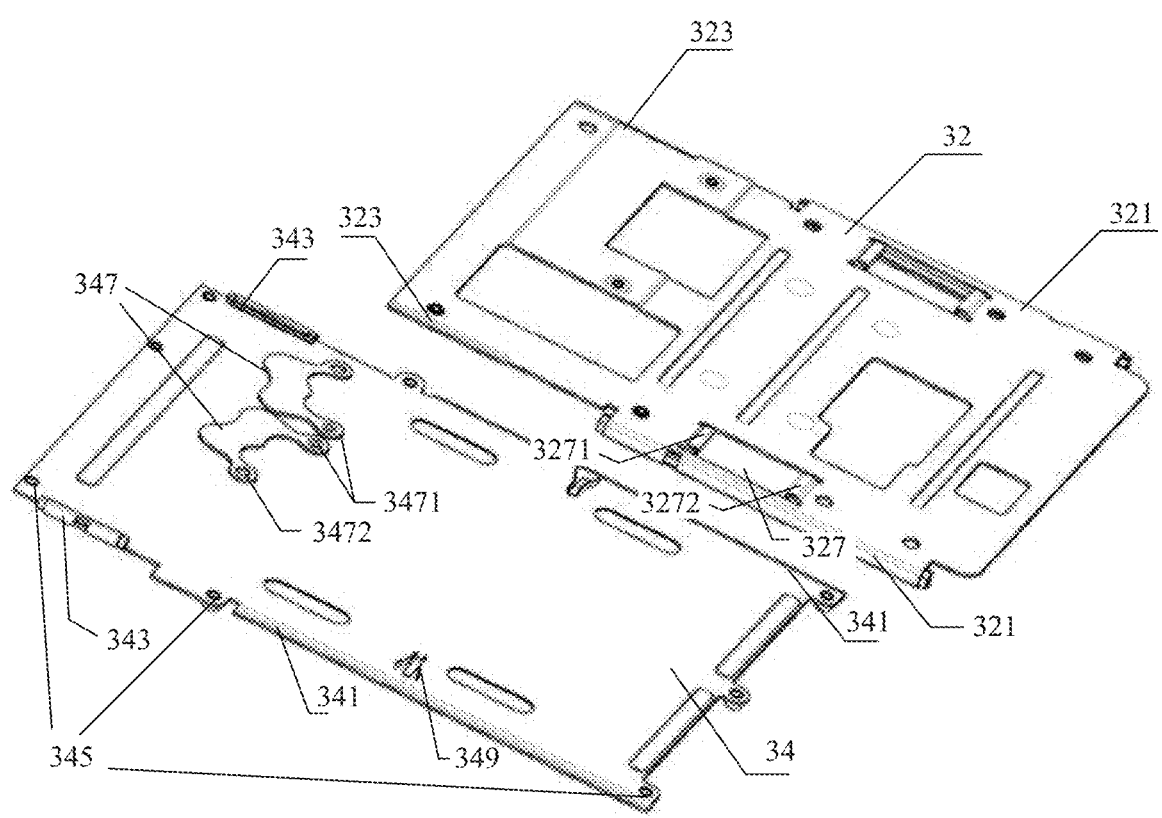
FIG. 2 is a schematic exploded diagram of a sliding structure 30 according to an embodiment of the present invention.
Figure 3:
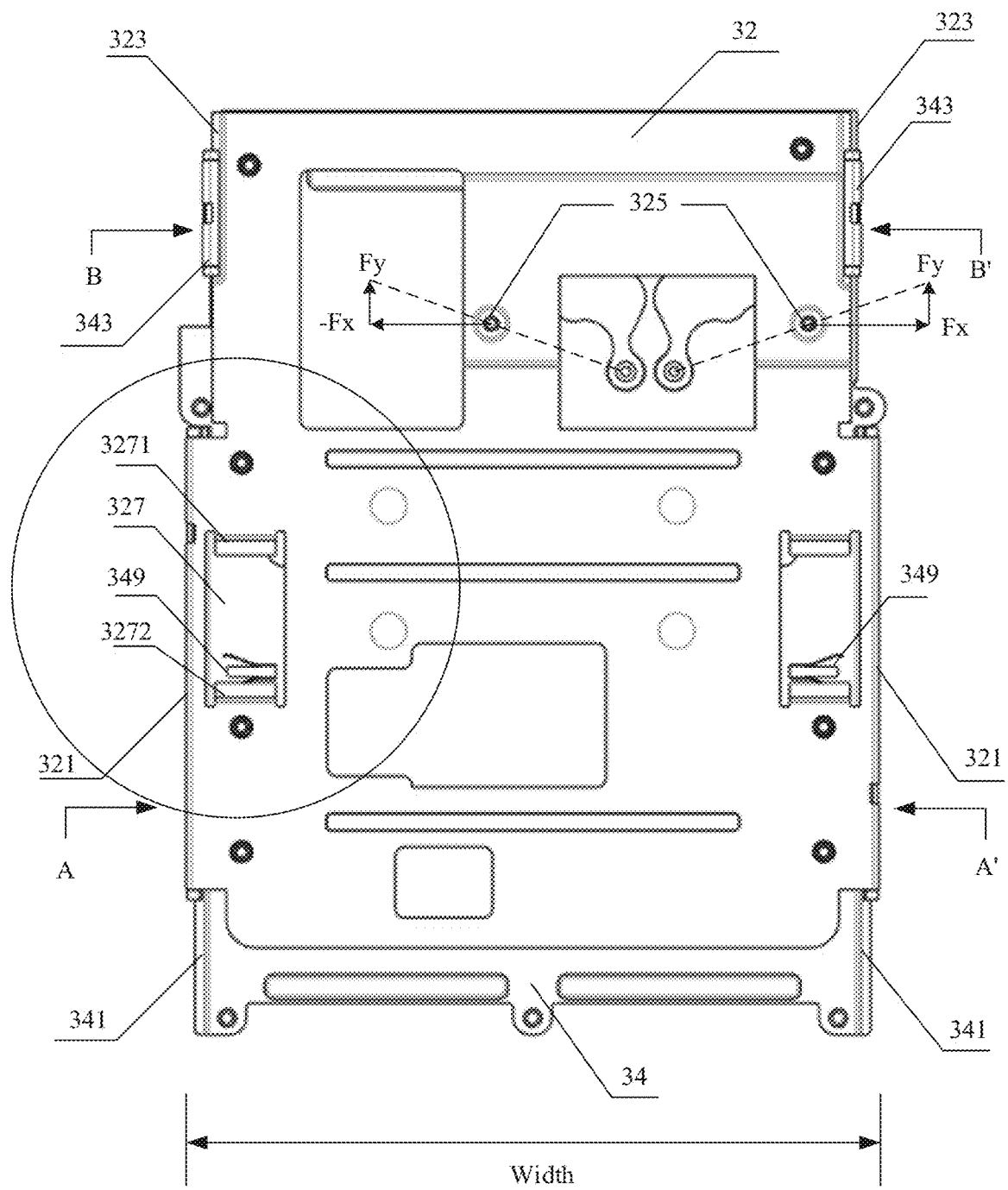
FIG. 3 is a schematic diagram of an assembled sliding structure 30 in FIG. 2.
Figure 4:
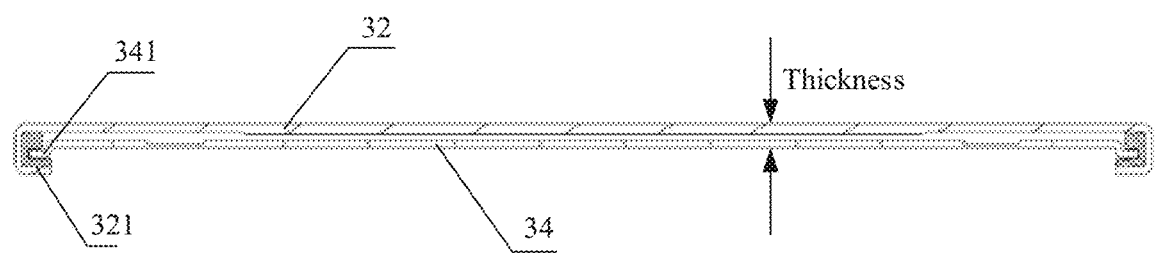
FIG. 4 is a sectional diagram of a direction A-A' in FIG. 3.
Figure 5:
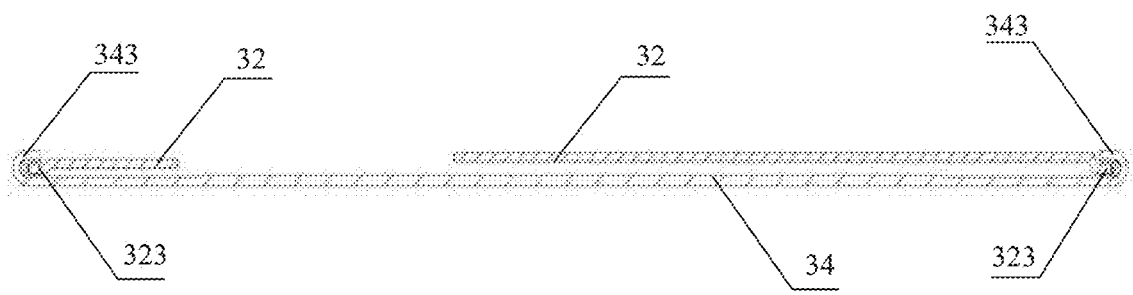
FIG. 5 is a sectional diagram of a B-B' direction in FIG. 3.

For a specific sliding structure 30, refer to FIG. 2 to FIG. 5. FIG. 2 is a schematic exploded diagram of a sliding structure 30 according to an embodiment of the present invention. FIG. 3 is a schematic diagram of an assembled sliding structure 30 in FIG. 2. FIG. 4 is a sectional diagram of a direction A-A' in FIG. 3. FIG. 5 is a sectional diagram of a direction B-B' in FIG. 3. As shown in the figure, the sliding structure 30 includes an upper substrate 32 and a lower substrate 34.

Two first slide grooves 321 are disposed at a first end of the upper substrate 32, and the two first slide grooves 321 are disposed opposite to each other. Correspondingly, two first slide rails 341 are disposed at a first end of the lower substrate 34, and the two first slide rails 341 are also disposed opposite to each other. The two first slide rails 341 can be respectively inserted into the two first slide grooves 321, to implement cooperation between the slide rails and the slide grooves.

In addition, two second slide rails 323 are further disposed at a second end of the upper substrate 32, and the two second slide rails 323 are disposed opposite to each other. Two second slide grooves 343 are further disposed at a second end of the lower substrate 34, and the two second slide grooves 343 are also disposed opposite to each other. The two second slide rails 323 can be respectively inserted into the two second slide grooves 343, to implement cooperation between the slide rails and the slide grooves. Optionally, the first slide groove 321 and the second slide rail 323 that are located on a same side of the upper substrate 32 may not be in contact, in other words, there may be a spacing between the first slide groove 321 and the second slide rail 323 that are located on the same side. Optionally, the second slide groove 343 and the first slide rail 341 that are located on a same side of the lower substrate 34 may not be in contact, in other words, there may be a spacing between the second slide groove 343 and the first slide rail 341 that are located on the same side.

After the upper substrate 32 and the lower substrate 34 are inserted, to be specific, after the two first slide rails 341 are respectively inserted into the two first slide grooves 321, and after the two second slide rails 323 are respectively inserted into the two second slide grooves 343, the first slide grooves 321 cooperate with the first slide rails 341, and the second slide grooves 343 cooperate with the second slide rails 323, so that the upper substrate 32 and the lower substrate 34 can slide relative to each other.

The first end of the upper substrate 32 may be a position close to a bottom of the upper substrate 32, and the second end of the upper substrate 32 may be a position close to a top of the upper substrate 32. Correspondingly, the first end of the lower substrate 34 is a position close to a bottom of the lower substrate 34, and the second end of the lower substrate 34 is a position close to a top of the lower substrate 34. Alternatively, in another implementation, the first end of the upper substrate 32 may be a position close to a top of the upper substrate 32, and the second end of the upper substrate 32 may be a position close to a bottom of the upper substrate 32. Correspondingly, the first end of the lower substrate 34 is a position close to a top of the lower substrate 34, and the second end of the lower substrate 34 is a position close to a bottom of the lower substrate 34. It should be noted that the bottom and the top are relative. Generally, the bottom refers to a position close to a bottom of the terminal, and the top refers to a position close to a top of the terminal. The bottom and the top of the terminal generally refer to the bottom and the top of the terminal when the terminal is normally used by a user.

In a specific implementation process, positions and sizes of the slide grooves and the slide rails may be selected based on structures of components in the terminal. For example, for a large-screen mobile phone, because a size of a display screen is relatively large, to avoid a conflict with a structure of a display module in the space, a structure in a direction facing a front housing of the upper substrate may be reduced. For example, the first slide groove 321 may be disposed at the bottom end of the upper substrate 32, and the first slide groove faces the first slide rail 341 in the lower substrate 34; and the second slide groove is disposed on the top of the lower substrate 34, and the second slide groove faces the second slide rail 323 in the upper substrate 32.

In an implementation, the first slide groove 321 is close to the bottom of the upper substrate 32, and a length of the first slide groove 321 is greater than or equal to a length of the second slide groove 343. In another implementation, the first slide groove 321 is close to the bottom of the upper substrate 32, and a length of the second slide groove 343 is greater than or equal to a length of the first slide groove 321.

It should be noted that, in a specific implementation, to cooperate with a structure of the terminal, structures of the two first slide grooves 321 may be the same or may be different. Structures of the two second slide grooves 343 may be the same or may be different. Correspondingly, a structure of the first slide rail 341 cooperates with the structure of the first slide groove 321; and a structure of the second slide rail 323 cooperates with the structure of the second slide groove 343.

Figure 6:
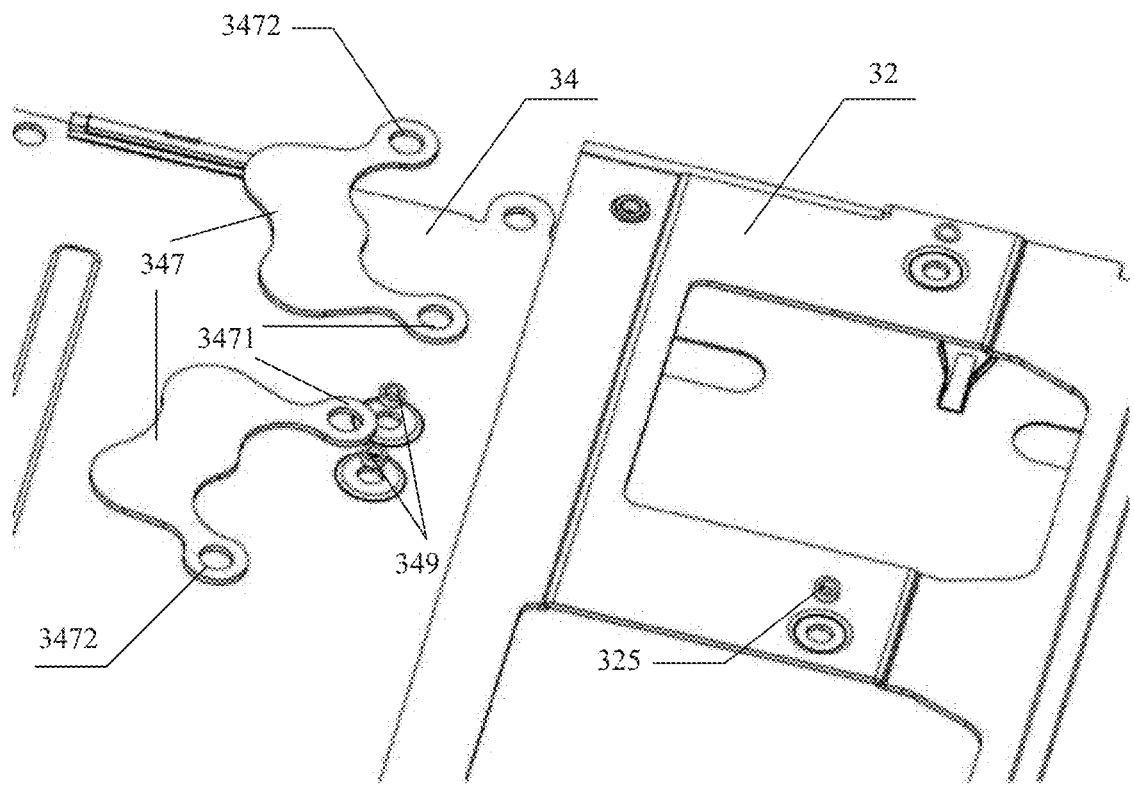
FIG. 6 is a partial schematic diagram of a sliding structure according to an embodiment of the present invention.

Further, as shown in FIG. 2, FIG. 3, and FIG. 6, the sliding structure 30 provided in this embodiment of the present invention may further include a spring 347. By riveting, welding, or screwing, two ends of the spring 347 are fastened to the upper substrate 32 and the lower substrate 34, respectively. The spring 347 may provide mechanical force for sliding of the sliding structure. To counteract a transverse imbalance force, two springs 347 may be symmetrically arranged. The transverse direction is a direction of $-Fx$ or $Fx$ in FIG. 3.

As shown in FIG. 2, FIG. 3, FIG. 6, and FIG. 7, the spring 347 includes a first connection end 3471 and a second connection end 3472. The first connection end 3471 is fastened to the lower substrate 34, for example, may be connected by using a first rivet 349 or screws, or may be connected by electric welding, or the like. The second connection end 3472 is fastened to the upper substrate 32, for example, may be connected by using the second rivet 325 or screws, or may be connected by electric welding, or the like. The two springs are symmetrically arranged side by side. When the upper substrate 32 and the lower substrate 34 are in an original state (a state in FIG. 3), to be specific, when the upper substrate 32 and the lower substrate 34 do not slide relative to each other, the spring 347 may be in a compressed state. In this case, as shown in FIG. 3, because the second connection end 3472 of the spring 347 is higher than the first connection end 3471, and the spring 347 is in the compressed state, a force generated by one spring 347 on the upper substrate 32 may be decomposed into an upward Fy force and a leftward $-Fx$ force. A force generated by the other spring 347 on the upper substrate 32 may be decomposed into an upward Fy force and a rightward Fx force. The leftward $-Fx$ force and the rightward Fx force are equal in magnitude and opposite in direction. In a process of sliding the upper substrate 32 and the lower substrate 34, the two springs 347 always generate two transverse forces of equal magnitude and opposite directions on the upper substrate 32, and the two transverse forces may counteract each other.

Figure 7:
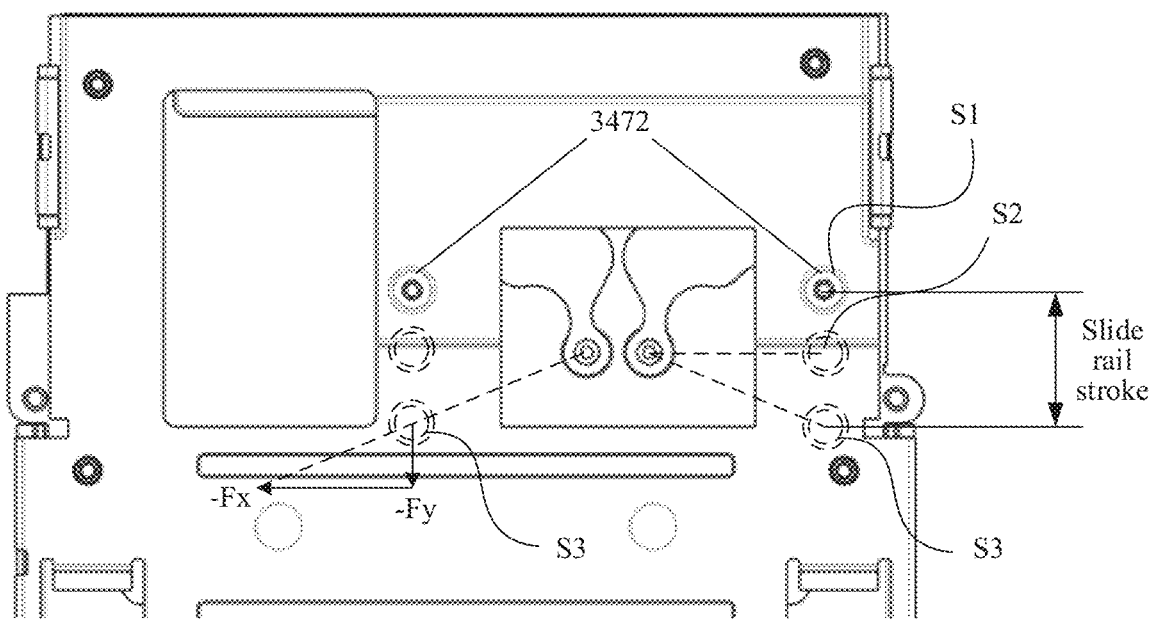
FIG. 7 is a partial schematic diagram of a sliding structure according to an embodiment of the present invention.

The force of the spring 347 on the upper substrate may also be related to the slide rail stroke. As shown in FIG. 7, when the upper substrate 32 and the lower substrate 34 are in an original state, the second connection end 3472 of the spring is in a position S1. When the upper substrate 32 slides downward relative to the lower substrate 34, the second connection end 3472 successively passes through a position S2 and a position S3. When the upper substrate 32 slides downward to a maximum distance, in other words, when the upper substrate 32 slides the slide rail stroke, the second connection end 3472 is located at the position S3. In the entire process, the spring 347 is in a compressed state. In a process in which the second connection end 3472 is located between the position S1 and the position S2, the spring 347 always generates an upward force (Fy) and a transverse force (Fx, $-Fx$) on the upper substrate 32. When the second connection end 3472 is in the position S2, the second connection end 3472 and the first connection end 3471 are in a same transverse direction. Therefore, the spring 347 generates the transverse force (Fx, $-Fx$) only on the upper substrate 32. In a process in which the second connection end 3472 is located between the position S2 and the position S3, the spring 347 always generates a downward force (Fy) and the transverse force (Fx, Fx) on the upper substrate 32. Therefore, in a process in which the upper substrate 32 starts to slide downward from the original state, after the second connection end 3472 of the spring 347 is slid to be lower than the first connection end 3471, to be specific, after the second connection end 3472 slides over the position S2 from the position S1, with the downward force of the spring 347, the upper substrate 32 may automatically slide downward. When the upper substrate 32 slides upward, after the second connection end 3472 is slid to be higher than e first connection end 3471, to be specific, after the second connection end 3472 slides over the position S2 from the position S3, with the upward force of the spring 347, the upper substrate 32 may automatically slide upward.

The foregoing embodiment is described by using an example in which the spring is always in the compressed state. In some other embodiments, a spring in a stretched state may further be disposed based on a specific structure of a terminal, an attribute of the spring, or a position at which the spring is installed, to provide a mechanical force.

A slide rail is of a symmetric dual-spring structure to provide a mechanical force. This counteracts a transverse imbalance force to prevent an upper slider and a lower slider from rotating relative to each other during sliding. In addition, after the transverse force is counteracted, a friction force in a sliding direction is also counteracted, making the sliding smoother.

The spring provided in this embodiment of the present invention may be made of a plurality of materials. When the material of the spring is electrically conductive, electrical connection between the upper substrate 32 and the lower substrate 34 may be implemented by using the spring, in other words, electrical connection between the upper slider and the lower slider is implemented. Generally, impedance of the spring is relatively high (for example, impedance is within 1 ohm). Therefore, a component that can withstand high impedance may be electrically connected by using the spring. For example, an antenna in the upper slider and an antenna in the lower slider may be conducted by using the spring.

Figure 8:
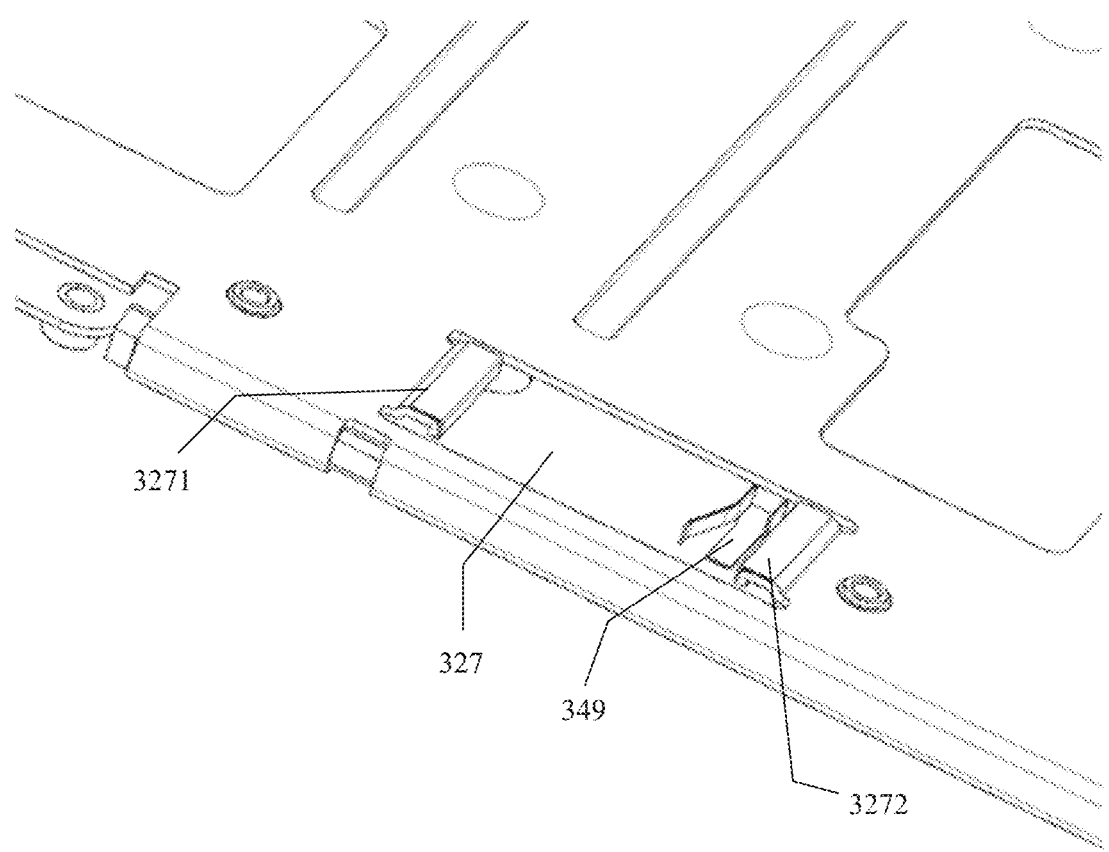
FIG. 8 is a partial enlarged diagram of a region 1 in FIG. 3.

To provide an electrical connection with less impedance, the sliding structure 30 provided in this embodiment of the present invention may further include a spring sheet and a metal pad to implement the electrical connection between the upper substrate and the lower substrate. As shown in FIG. 2, FIG. 3, and FIG. 8, a spring sheet 349 is disposed on the lower substrate 34. The upper substrate 32 is provided with a hole 327, and a first metal pad 3271 and a second metal pad 3272 are respectively disposed at two ends of the hole 327. As shown in FIG. 3, after the upper substrate 32 and the lower substrate 34 are assembled, in an initial state, the spring sheet 349 is in contact with the second metal pad 3272. In this case, the electrical connection between the upper substrate 32 and the lower substrate 34 can be implemented. In a process in which the upper substrate 32 slides downward relative to the lower substrate 34, the spring sheet 349 slides in the hole 327, and the spring sheet 349 is not in contact with the metal pad 3271 nor the metal pad 3272. When the lower substrate 32 slides downward to a bottom end, the spring sheet 349 is in contact with the first metal pad 3271. In this case, the electrical connection between the upper substrate 32 and the lower substrate 34 can also be implemented. In other words, when the upper substrate 32 slides at a start position and an end position, the upper substrate 32 and the lower substrate 34 can be electrically conducted by using the spring sheet and the metal pad (pad).

In a specific implementation, spring sheets and metal pads of different materials may be used based on different impedance requirements during electrical connection between components in the upper slider and the lower slider. Different materials can provide different impedance. For example, when the spring sheet and the metal pad are made of a gold-plated material, impedance can be within 0.1 ohm, to implement an impedance requirement of fast charging of hardware.

Further, to avoid abrasion of the spring sheet in a sliding process, the upper substrate 32 may not be in contact with the spring sheet 349 in the sliding process.

In this embodiment, only one spring sheet 349 and two metal pads that cooperate with the spring sheet may be disposed. Alternatively, two or more spring sheets 349 and two metal pads that cooperate with each spring sheet 349 may be disposed. A quantity of holes 327 may be the same as a quantity of spring sheets 349.

In another embodiment, the spring sheet in the foregoing embodiment may be replaced with the metal pad, and the metal pad in the foregoing embodiment may be replaced with the spring sheet. In other words, one metal pad cooperates with two spring sheets to implement an electrical connection between the upper substrate and the lower substrate.

In an embodiment of the present invention, a terminal is further provided. The terminal includes an upper slider, a lower slider, and the foregoing sliding structure 300. An upper substrate 32 in the sliding structure 300 is fastened to the upper slider. A lower substrate 34 is fastened to the lower slider. After the upper substrate 32 and the lower substrate 34 are assembled, the upper slider and the lower slider can slide relative to each other under the driving of the sliding structure.

In an implementation, the upper slider may include a display module, and the upper substrate 32 is fastened to the display module. The lower slider may include a mainboard or a battery required by the terminal, and the lower substrate 34 is fastened to the mainboard or the battery. Further, for ease of connection, the upper slider may further include a front housing that is, separately fastened to the display module and the upper substrate 32. Alternatively, for ease of connection, the lower slider may further include a rear housing or a housing that is separately fastened to the mainboard the battery, and the lower substrate. Any two components do not need to be fastened, provided that all components are fastened.

In another implementation, in addition to the display module, the upper slider may further include a mainboard or a battery. The lower slider may include a housing fastened to the lower substrate. Further, for ease of connection, the upper slider may further include a front housing that is separately fastened to the display module, the mainboard, the battery, and the upper substrate 32.

The terminal may further include many other components, for example, one or more of a memory, an antenna, an audio circuit, a radio frequency circuit, a Bluetooth module, a Wi-Fi module, and various sensors. According to a structure of the terminal, these components may be disposed on the mainboard, may be disposed on the upper slider, or may be disposed on the lower slider.

Figure 9:
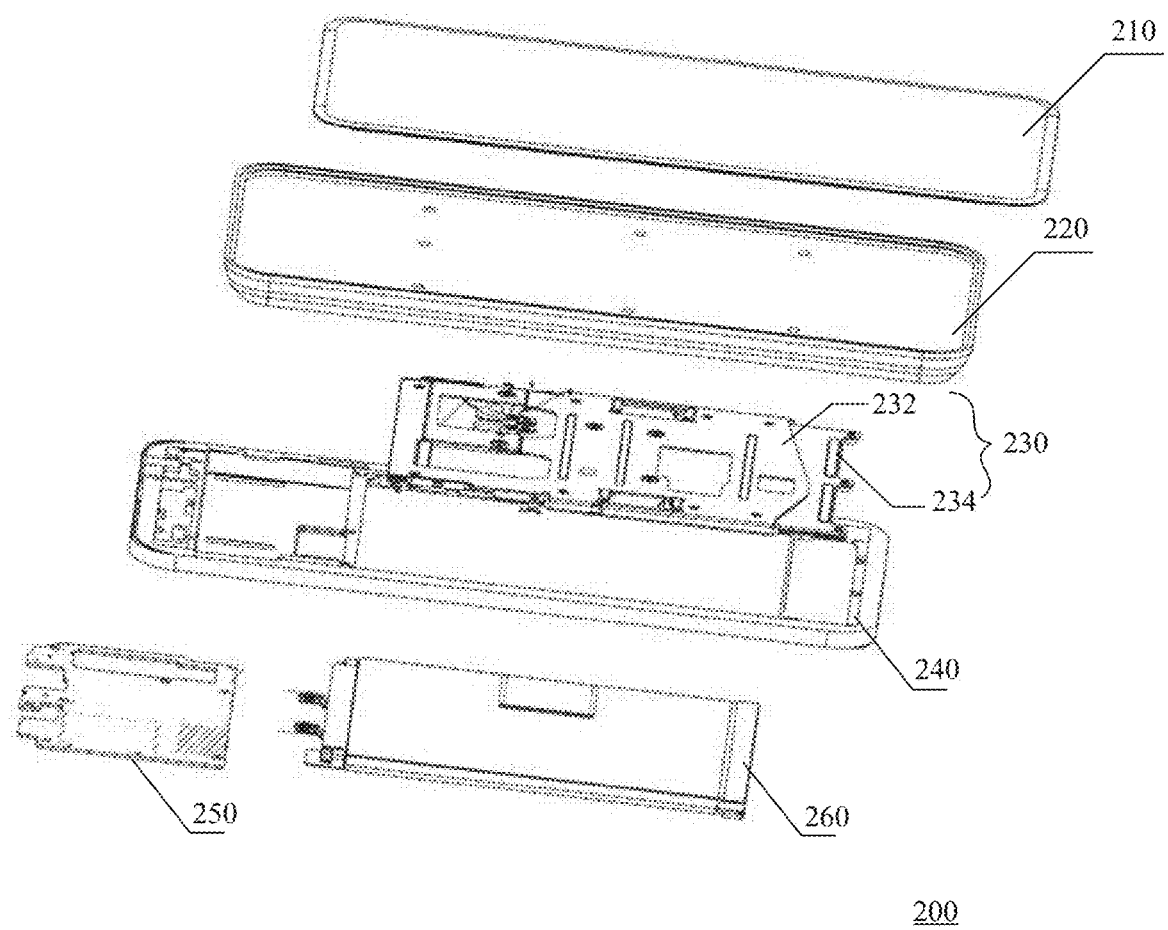
FIG. 9 is an exploded structural diagram of a terminal 200 according to an embodiment of the present invention.

FIG. 9 is an exploded structural diagram of a terminal 200 according to an embodiment of the present invention. The terminal 200 is, for example, a mobile phone. As shown in FIG. 9, the terminal 200 includes a display module 10, a front housing 20, a sliding structure 30, a rear housing 40, a mainboard 50, a battery 60, and a housing (not shown in the figure).

The display module 10 may include a display screen of the terminal 200. The display screen may be configured to display information entered by a user or information provided for a user, and various menus of the terminal 200. The display screen may include a display panel. Optionally, the display panel may be configured in a form of a liquid crystal display (liquid crystal display, LCD for short), an organic light-emitting diode (organic light-emitting diode, OLED for short), or the like. For a touchscreen terminal, the display module 10 may further include a touch panel, also referred to as a touchscreen. The touch panel may collect a touch operation of the user on or near the touch panel (for example, the operation performed on or near the touchscreen by the user by using a finger, a stylus, and any other suitable object or accessory), and drive a corresponding connection apparatus according to a preset program. Optionally, the touch panel may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, sends the touch point coordinates to a processor in the terminal, and can receive and execute a command sent by the processor. In addition, the touch panel may be implemented by using a plurality of types such as a resistive type, a capacitive type, an infrared ray, and a surface acoustic wave type. Further, the touch panel may cover the display panel. After detecting a touch operation on or near the touch panel, the touch panel transmits the touch operation to the processor in the terminal to determine a type of a touch event, and then the processor provides corresponding visual output on the display panel based on the type of the touch event. The touch panel and the display panel may be used as two independent components or integrated together to implement an input function and an output function of the terminal 200.

The display module 10 is fixedly assembled with the front housing 20. Generally, the side of the display module 10 is a front side of the terminal. The rear housing is a rear side of the terminal.

The sliding structure 30 includes an upper substrate 32 and a lower substrate 34. The upper substrate 32 and the lower substrate 34 can slide relative to each other.

The upper substrate 32 is fixedly assembled with the front housing 20. For example, the upper substrate 32 may be fastened to the front housing 20 by using a screw. After the upper substrate 32 is fastened to the front housing 20, the front housing 20 and the display module 10 can slide with the upper substrate 32.

The lower substrate 34 is fixedly assembled with the rear housing 40. For example, the lower substrate 34 may be fastened to the rear housing 40 by using a screw. The rear housing 40, the mainboard 50, the battery 60, and the housing are fixedly assembled together. The rear housing 40, the mainboard 50, the battery 60, and the housing can slide with the lower substrate 34. The mainboard 50 may be a circuit board on which a circuit component required by the terminal is installed, for example, a PCB board on which a component is installed.

It should be noted that the components of the terminal in FIG. 9 are merely used as an example for description, and are merely used to describe a connection relationship between the sliding structure and another component in the terminal. A specific shape and a structure of each component are not limited, provided that the sliding between the upper slider and the lower slider can be implemented according to the connection relationship in this embodiment. Each component may have another shape and structure. For example, a shape and a size of the display screen are not limited in the display module, and the mainboard and the battery may also have another shape and structure.

In this embodiment, the upper slider of the terminal may include the display module 10 and the front housing 20. The lower slider of the terminal may include the rear housing 40. Further, the lower slider may further include the mainboard 50, the battery 60, and the housing. The upper slider and the lower slider may slide relative to each other by using the sliding structure.

In another embodiment, the upper slider of the terminal may include a display module, a front housing, a mainboard, and a battery. The display module, the front housing, the mainboard, the battery, and the upper substrate are fastened together, and slide along with sliding of the upper substrate. The lower slider includes a rear housing. The rear housing is fastened to the lower substrate.

The lower substrate 34 may be fastened to the rear housing 40 by using a plurality of screws. For example, three screws may be fastened in each of two long side directions of the lower substrate 34 by using holes 345, in other words, six screws are fastened in total. Similarly, the upper substrate 32 may also be fastened to the front housing 20 by using a plurality of screws. In structures of slide grooves and slide rails at an upper segment and a lower segment in the upper substrate 32 and the lower substrate 34, the slide grooves or the slide rails can bypass the screws in a relative sliding process of the upper substrate 32 and the lower substrate 34. For example, when the upper substrate 32 slides downward relative to the lower substrate 34, a second slide rail 323 may bypass a screw located in a middle of the long side of the lower substrate 34.

In the sliding structure provided in this embodiment, the slide grooves and the slide rails may be disposed at the upper end and the lower end of the upper substrate and the lower substrate, so that a length of the slide rails can be increased, and the front housing 20 and the rear housing 40 are relatively tight and securely connected, to prevent the front housing and the rear housing from opening due to a loose connection.

Based on structural parameters such as a size and a shape of the terminal, the sliding structure provided in this embodiment of the present invention may have a plurality of sizes, provided that the plurality of sizes meet a requirement of a sliding track. For example, a width of the sliding structure may be between 55 mm and 75 mm. As shown in FIG. 3, the width refers to a distance between two slide rails (or slide grooves) in the upper substrate or the lower substrate. A thickness of the sliding structure may be within 2.0 mm. As shown in FIG. 4, the thickness refers to a total thickness of the upper substrate and the lower substrate after assembly, and includes a thickness of the upper substrate, a thickness of the lower substrate, and a thickness of a gap between the upper substrate and the lower substrate. For example, the slide rail stroke may be within 25 mm, and the slide rail stroke refers to a maximum distance of sliding of the upper substrate relative to the lower substrate. According to a required slide rail stroke, a blocking structure may be disposed on the slide groove and the slide rail, so that the upper substrate and the lower substrate satisfy the slide rail stroke when sliding. Alternatively, a blocking structure may be disposed on the front housing 20 or the rear housing 40, so that the front housing 20 and the rear housing 40 satisfy the slide rail stroke when sliding with the upper substrate and the lower substrate.

It should be noted that the accompanying drawings are merely examples for description. To implement the foregoing described implementations, there may be another structure. According to the sliding structure provided in this embodiment of the present invention, in an implementation, the upper substrate 32 in an initial state can slide downward relative to the lower substrate 34, and then slide upward to restore to the initial state. In another implementation, the upper substrate 32 in an initial state can slide upward relative to the lower substrate 34, and then slide downward to restore to the initial state.

The sliding structure provided in this embodiment of the present invention may be applicable to a large-screen terminal, so that the large-screen terminal slides along long sides, in other words, slide rails are disposed on the long sides of the terminal. The sliding structure implements a long slide rail by using two slide rails, so that a fastening screw can be added along a length direction of the slide rails without affecting sliding, to prevent a front housing and a rear housing of the large-screen terminal from opening, and to implement short-stroke sliding of the large-screen terminal. In addition, a transverse imbalance force may be counteracted by using a symmetric dual-spring structure to provide a mechanical force, so that the upper slider and the lower slider are more secure when sliding, which prevents the upper slider and the lower slider from relatively rotating when sliding, and the sliding is smoother due to the counteraction of the transverse force. An electrical connection between the upper slider and the lower slider can be further implemented by using a spring or a spring structure.

Figure 10:
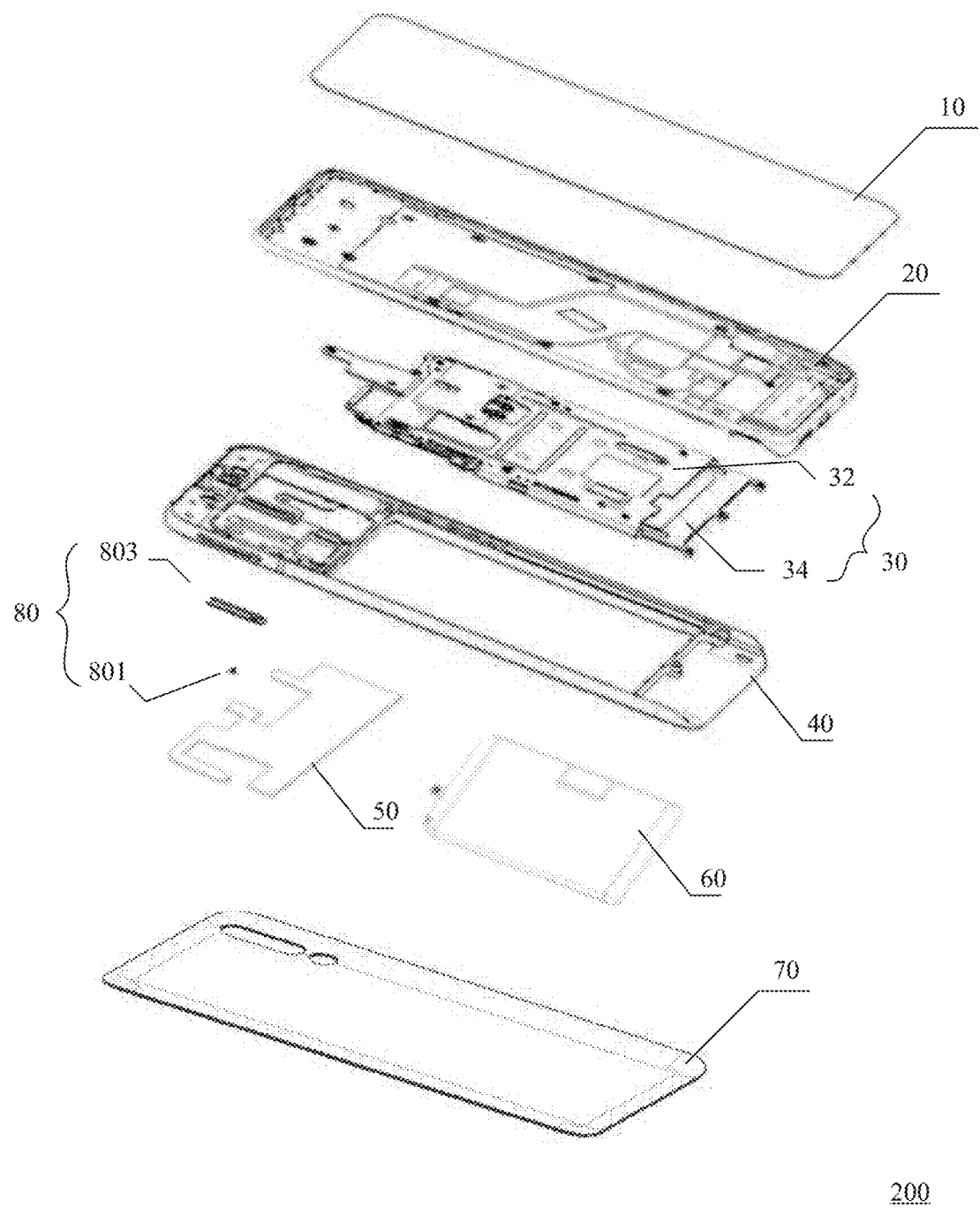
FIG. 10 is an exploded structural diagram of another terminal 200 according to an embodiment of this application.

In the terminal provided in this embodiment of this application, the upper slider and the lower slider can slide relative to each other. Therefore, there is a gap between the upper slider and the lower slider. To make the gap between the upper slider and the lower slider smaller, on the basis of the embodiment in FIG. 9, an auxiliary slide rail may be further added between the upper slider and the lower slider. FIG. 10 is an exploded structural diagram of another terminal 200 according to an embodiment of this application. As shown in FIG. 10, the terminal 200 includes a display module 10, a front housing 20, a sliding structure 30, a rear housing 40, a mainboard 50, a battery 60, and a housing 70. These components are the same as content in the foregoing embodiment. Details are not described herein again. It may be understood that specific shapes and structures of these components are not limited in this embodiment of this application. In a specific implementation process, different terminals may have different specific structures. As shown in FIG. 10 and FIG. 9, appearances of these components are not completely the same. In addition to the foregoing components, as shown in FIG. 10, the terminal 200 may further include an auxiliary slide rail 80. The auxiliary slide rail 80 includes a slide component 801 and a slide groove component 803. The auxiliary slide rail 80 is fastened between an upper slider and a lower slider. When the upper slider and the lower slider slide relative to each other, the slide component 801 may slide relative to the slide groove component 803. It should be noted that the terminal may include one or more auxiliary slide rails 80.

The slide component 801 may fixed to the upper slider, or may be fastened to the lower slider.

When the slide component 801 is fixed to the upper slider, the slide groove component 803 is fastened to the lower slider. The slide component 801 is fastened to a front housing 20 in the upper slider, and the slide groove component 803 is fastened to the rear housing 40 in the lower slider. It may be understood that, in this implementation, the lower slider includes one accommodation space, configured to accommodate some of the slide components 801, When the two sliders slide relative to each other, the slide component 801 can slide in the accommodation space. Alternatively, the upper slider and the lower slider include accommodation space, configured to accommodate the slide component 801 during sliding.

When the slide component 801 is fastened to the lower slider, the slide groove component 803 is fastened to the upper slider. The slide component 801 is fastened to the rear housing 40 in the lower slider, and the slide groove component 803 is fastened to the front housing 20 in the upper slider. It may be understood that, in this implementation, the upper slider includes accommodation space, configured to accommodate some of the slide components 801. When the two sliders slide relative to each other, the slide component 801 can slide in the accommodation space. Alternatively, the upper slider and the lower slider include accommodation space, configured to accommodate the slide component 801 during sliding.

Figure 11A:
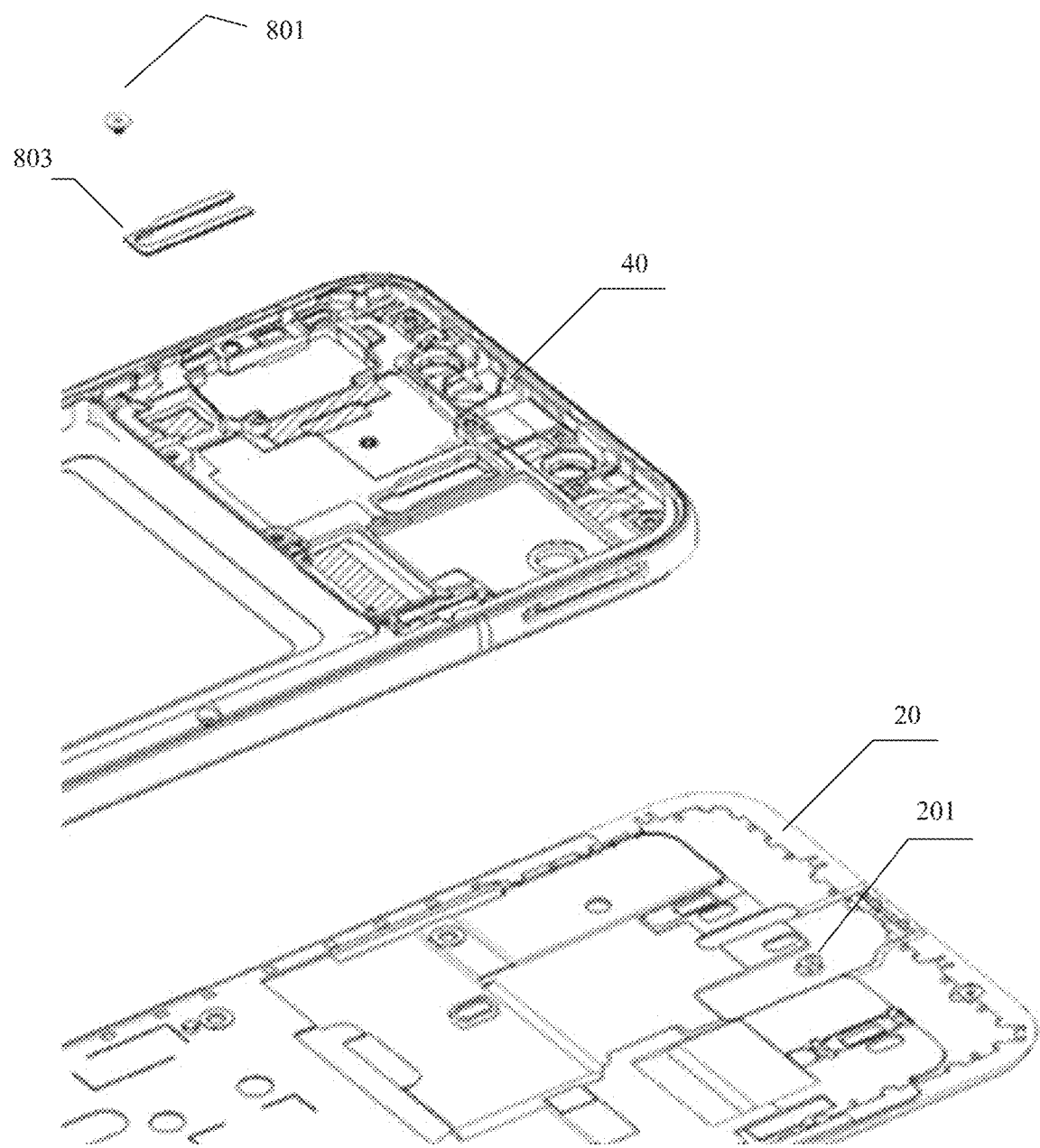
FIG. 11A is an exploded diagram of a partial structure of the terminal in FIG. 10.

FIG. 11A is an exploded diagram of a partial structure of the terminal in FIG. 10, FIG. 11A shows a front housing 20, a rear housing 40, a slide component 801, and a slide groove component 803. The slide component 801 is fastened to the front housing 20. The slide groove component 803 is fastened to the rear housing 40. When the front housing 20 and the rear housing 40 slide relative to each other, the slide component 801 can slide in a slide groove of the slide groove component 803, to implement relative sliding of the slide component 801 and the slide groove component 803.

The slide component 801 may be, for example, a screw or a component similar to a top cap of a screw. A manner of connecting the slide component 801 to the front housing 20 is not limited in this embodiment. For example, the front housing 20 may include a connection component 201 fastened to the front housing 20. The slide component 801 may be fastened to the connection component 201, in other words, the slide component 801 may be fastened to the front housing by using the connection component 201. When the slide component 801 is screwed, the connection component 201 may be a nut that matches the slide component 801. Certainly, the slide component 801 may alternatively be in another shape, provided that the slide component 801 and the slide groove component 803 can slide in cooperation with each other.

Figure 11B:
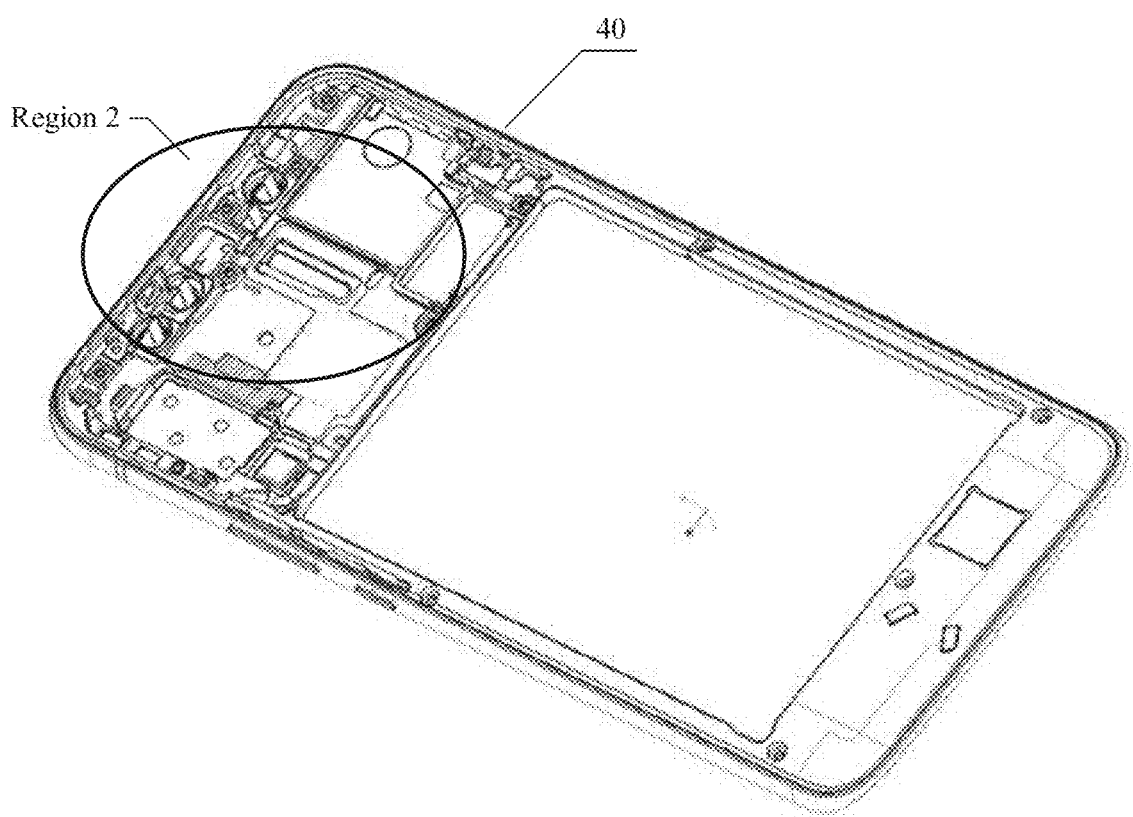
FIG. 11B is a schematic diagram of a rear housing 40 of the terminal in FIG. 10.
Figure 11C:
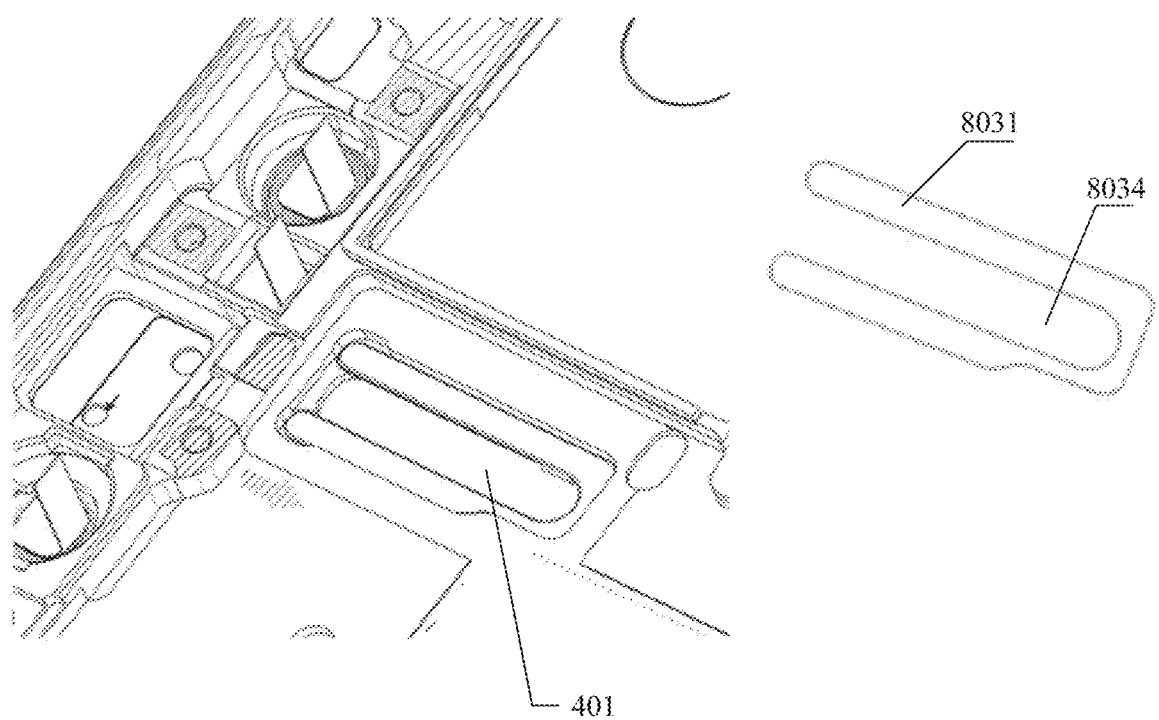
FIG. 11C is a partial schematic diagram of the rear housing 40 and the slide groove component 803 in FIG. 11B.

FIG. 11B is a schematic diagram of a rear housing 40 of the terminal in FIG. 10. FIG. 11C is a partial schematic diagram of the rear housing 40 and the slide groove component 803 in FIG. 11B. Specifically, FIG. 11C is an enlarged diagram of a region 2 in FIG. 11B. As shown in FIG. 11B and FIG. 11C, a long strip-shaped hole 401 is disposed in the rear housing 40. The slide groove component 803 has a long strip-shaped slide groove 8034. A shape of the slide groove 8034 matches a shape of the hole 401. When the slide groove component 803 is fastened to the rear housing 40, the slide groove 8034 overlaps the hole 401. The slide component 801 may be fastened to the front housing 20 by using the slide groove 8034 and the hole 401 in sequence. Therefore, when the front housing 20 and the rear housing 40 slide relative to each other, the slide component 801 can slide in the slide groove 8034 and the hole 401.

Figure 11D:
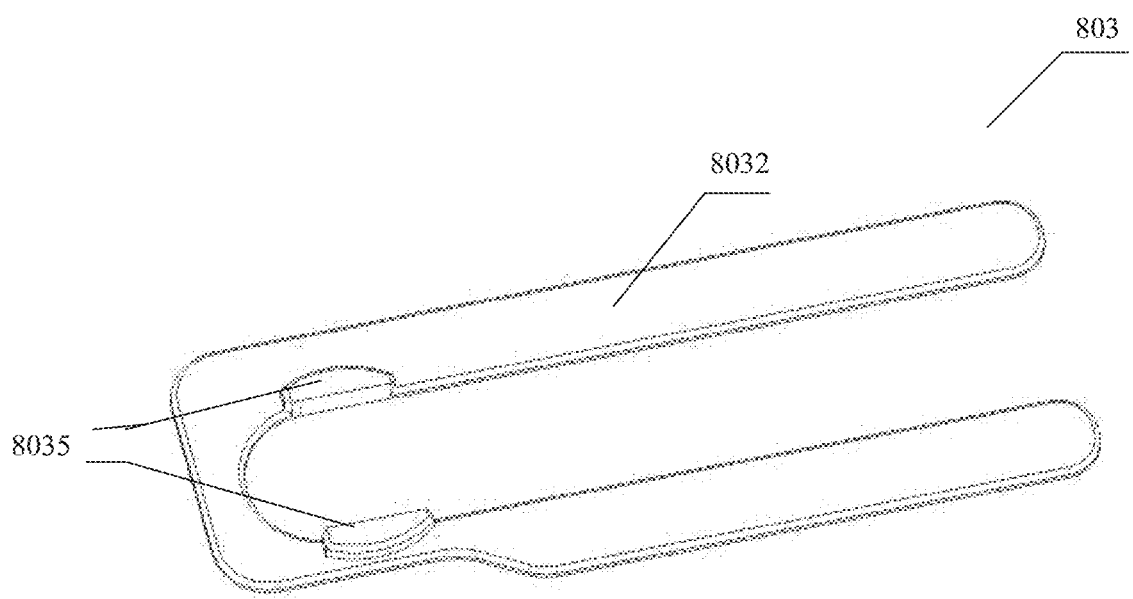
FIG. 11D is a schematic diagram of the slide groove component 803 in FIG. 11C.

FIG. 11D is a schematic diagram of another surface of the slide groove component 803 in FIG. 11C. As shown in FIG. 11C and FIG. 11D, the slide groove component 803 may include a first surface 8031 and a second surface 8032 that are back to back. The first surface 8031 is disposed back to the front housing 20, The second surface 8032 faces the front housing 20. When the slide groove component 803 is fastened to the rear housing 40, the second surface 8032 of the slide groove component 803 is in contact with the rear housing 40. A manner of connecting the slide groove component 803 to the rear housing 40 is not limited in this embodiment. The slide groove component 803 may be attached together with the rear housing 40 by using glue, or the slide groove component 803 and the rear housing 40 may also be integrally formed. Further, to facilitate fastening of the slide groove component 803 and the rear housing 40, the slide groove component 803 may have a positioning part 8035. As shown in FIG. 11D, the slide groove component 803 may have two positioning parts that cooperate with a structure of the rear housing 40. A structure and a quantity of the positioning part are not limited in this embodiment, By using the positioning part 8035, the slide groove component 803 can accurately locate the rear housing 40 when the slide groove component 803 and the rear housing 40 are fastened.

The slide groove component 803 may have a lubricated or smooth surface, to facilitate sliding of the slide component 801. Therefore, a material with a high lubrication degree may be selected for the slide groove component 803, or a material with a high lubrication degree is coated on a surface of the slide groove component 803. For example, a material of the slide groove component 803 may be polyoxymethylene (POM, which is a thermoplastic crystalline polymer). Alternatively, the slide groove component 803 may be made of another material, and paint with the high lubrication degree is coated on the surface of the slide groove component 803, to ensure lubrication.

Figure 12A:
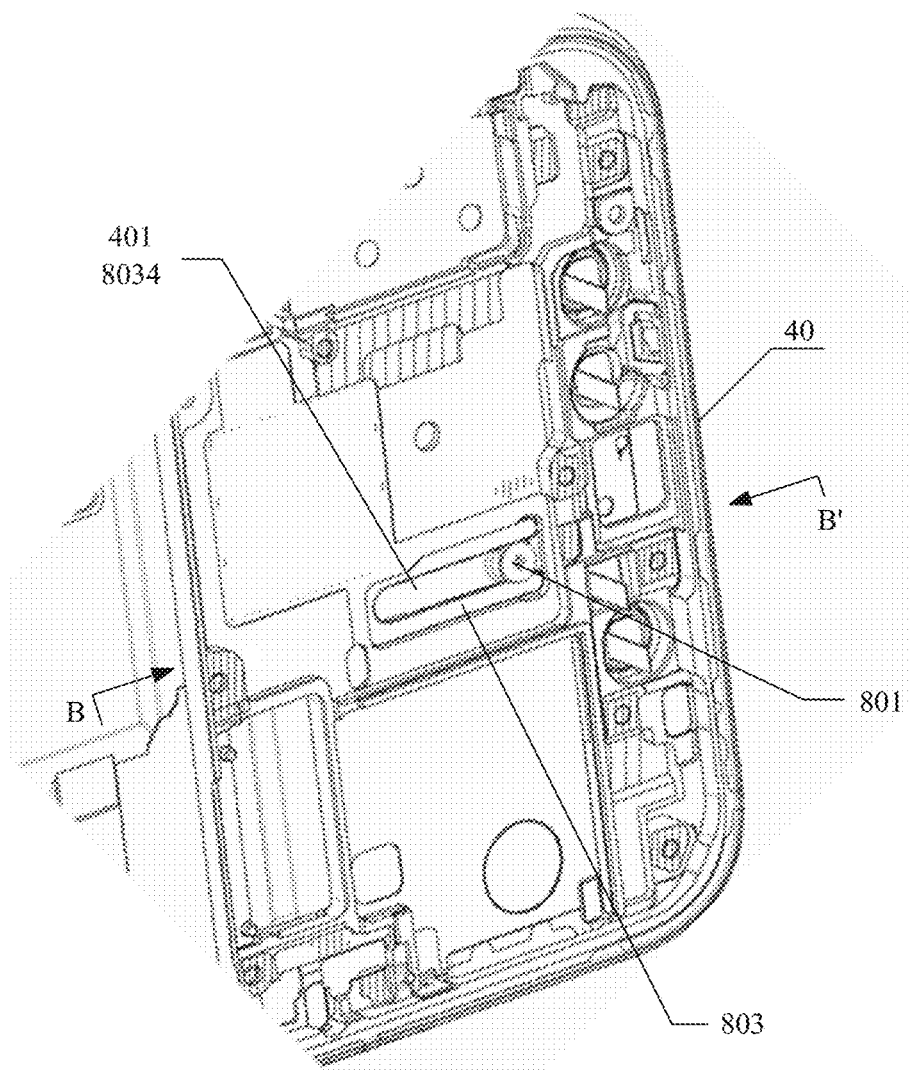
FIG. 12A is a schematic diagram of partial assembly of the terminal in FIG. 10.
Figure 12B:
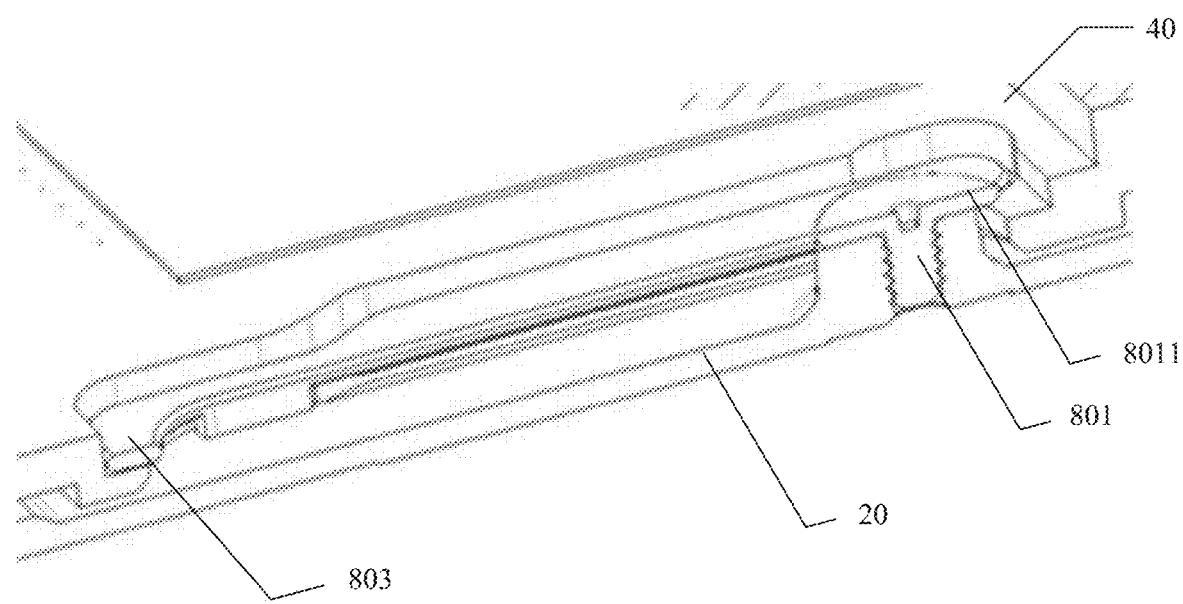
FIG. 12B is a sectional diagram of a C-C' direction in FIG. 12A.

FIG. 12A is a schematic diagram of partial assembly of the terminal in FIG. 10. FIG. 12B is a sectional diagram of a C-C' direction in FIG. 12A. As shown in FIG. 12A and FIG. 12B, the slide component 801 is fastened to the front housing 20 by using the slide groove 8034 and the hole 401 in sequence. After the slide component 801 is fastened, an outer edge 8011 of the slide component 801 can stick the slide groove component 803 and the rear housing 40. In other words, after the slide component 801 is fastened to the front housing 20, the slide groove component 803, the rear housing 40, and the front housing 20 are fastened together. The slide component 801 penetrates the slide groove 8034 of the slide groove component 803 and the hole 401 of the rear housing 40. In addition, the slide component 801 can slide along the slide groove 8034 and the hole 401.

It should be noted that, as shown in FIG. 10, FIG. 11A to FIG. 11D, FIG. 12A, and FIG. 12B, the slide component 801 is fastened to the front housing 20 of the upper slider, and the slide groove component 803 is fastened to the rear housing 40 of the lower slider. However, this application is not limited thereto. In another embodiment, the slide component 801 may be fastened to the rear housing 40, and the slide groove component 803 is fastened to the front housing 20. In this embodiment, a corresponding hole (similar to the hole 401) may be disposed in the front housing 20, to accommodate the slide component 801. In this way, the slide component can slide in the hole of the front housing 20.

Figure 13:
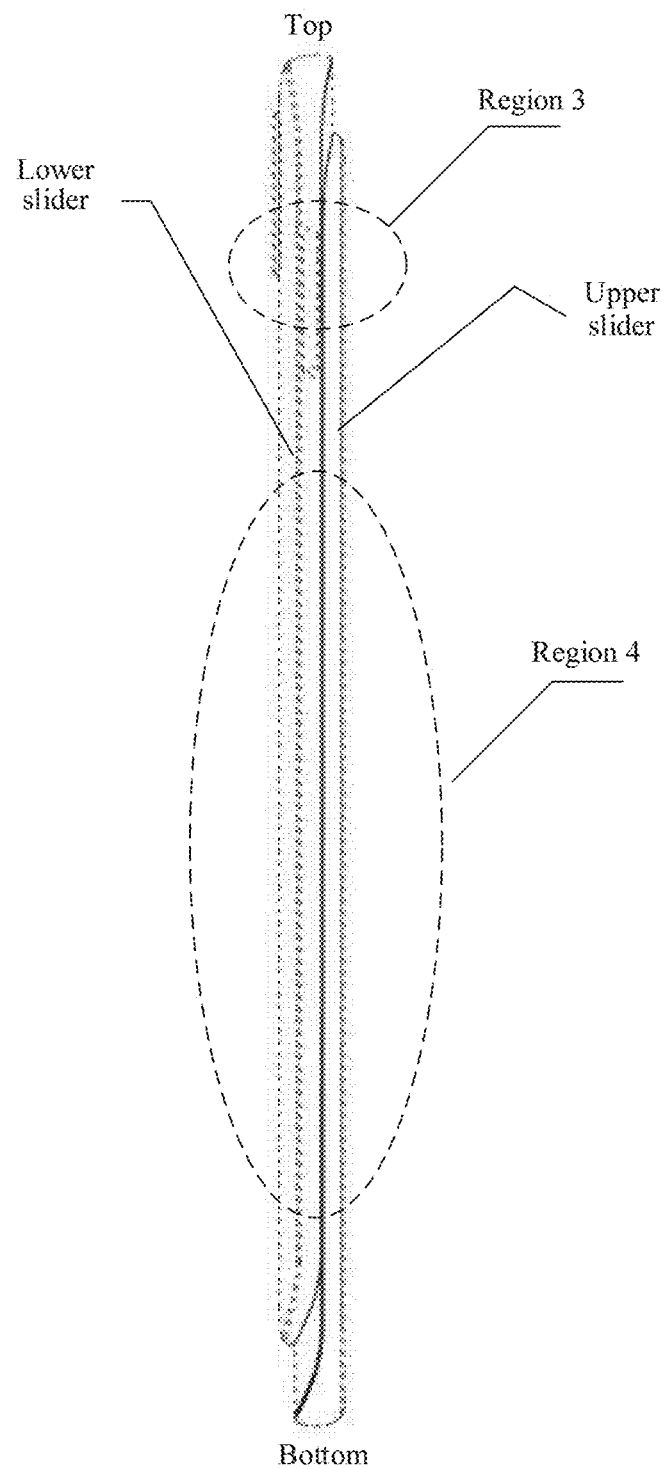
FIG. 13 is a schematic diagram of a terminal 200 according to an embodiment of this application.

The auxiliary slide rail 80 and the sliding structure 30 provided in this embodiment of this application may be located at different positions of the terminal, and the sliding structure 30 may do not overlap or intersect the auxiliary slide rail 80. For example, if the sliding structure 30 is located at a position close to a bottom of the terminal, the auxiliary slide rail 80 may be located at a position close to a top of the terminal. If the sliding structure 30 is located at the position close to the top of the terminal, the auxiliary slide rail 80 may be located at the position close to the bottom of the terminal. As shown in FIG. 13, a terminal includes an upper slider and a lower slider. The upper slider and the lower slider may slide relative to each other by using the sliding structure 30. A state in FIG. 13 is that the lower slider slides toward a top of the terminal relative to the upper slider, in other words, the upper slider slides toward a bottom of the terminal relative to the lower slider. In an implementation, the sliding structure 30 is located in a region 4 close to the bottom of the terminal, and the auxiliary slide rail 80 is located in a region 3 close to the top of the terminal. In another implementation, the sliding structure 30 is located in a region 3 close to the top of the terminal, and the auxiliary slide rail 80 is located in a region 4 close to the bottom of the terminal. Further, in a process in which the upper slider and the lower slider slide relative to each other, neither the auxiliary slide rail 80 nor the sliding structure 30 is visible to a user, in other words, the auxiliary slide rail 80 and the sliding structure 30 are not exposed.

The terminal provided in this embodiment of this application includes the upper slider and the lower slider that can slide relative to each other. Therefore, there is a gap between the upper slider and the lower slider. The sliding structure 30 in this embodiment of this application is divided into two groups: an upper group and a lower group. The two groups of structures are nested and entangled with each other. This can ensure enough strength, and make the gap between the upper slider and the lower slider smaller. However, the sliding structure cannot completely cover the upper slider and the lower slider, and in a position that has no sliding structure, the gap between the upper slider and the lower slider may increase. Alternatively, in the process in which the upper slider and the lower slider slide relative to each other, the gap between the upper slider and the lower slider may be uneven. Therefore, in an embodiment of this application, the auxiliary slide rail 80 is further provided. The auxiliary slide rail 80 is located at the position that has no sliding structure between the upper slider and the lower slider. The auxiliary slide rail 80 can make the upper slider closely attached to the lower slider, further reduces the gap between the upper slider and the lower slider, and makes the gap between the upper slider and the lower slider even in the relative sliding process.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal, comprising:
    an upper slider;
    a lower slider; and
    a sliding structure coupling the upper slider to the lower slider, wherein the sliding structure comprises:
        an upper substrate coupled to the upper slider and comprising:
            two first slide grooves disposed at a first end of the upper substrate, wherein the two first slide grooves are disposed opposite to each other; and
            two first slide rails disposed at a second end of the upper substrate, wherein the two first slide rails are disposed opposite to each other; and
        a lower substrate coupled to the lower slider and comprising:
            two second slide rails disposed at a first end of the lower substrate, wherein the two second slide rails are disposed opposite to each other, wherein the second slide rails are respectively assembled in the two first slide grooves, and wherein the second slide rails are configured to slide in cooperation with the first slide grooves; and two second slide grooves disposed at a second end of the lower substrate, wherein the two second slide grooves are disposed opposite to each other, wherein the two first slide rails are respectively assembled in the two second slide grooves, and wherein the first slide rails are configured to slide in cooperation with the second slide grooves.

2. The terminal of claim 1, wherein the upper slider comprises a display and a front housing, wherein the display is fixedly assembled with the front housing, wherein the front housing is fastened to the upper substrate, wherein the lower slider comprises a rear housing, and wherein the rear housing is fastened to the lower substrate.

3. The terminal of claim 2, wherein the lower slider further comprises a mainboard, a battery, and a housing that are fixedly assembled.

4. The terminal of claim 2, wherein the upper slider further comprises a mainboard or a battery, and wherein the display, the mainboard, and the front housing are fixedly assembled, the display, the battery, and the front housing are fixedly assembled or the display, the mainboard, the front housing, and the battery are fixedly assembled.

5. The terminal of claim 1, further comprising an auxiliary slide rail fastened between the upper slider and the lower slider.

6. The terminal of claim 5, wherein the auxiliary slide rail comprises a slide component and a slide groove component, wherein the slide component is configured to slide relative to the slide groove component, and wherein the slide component is fastened to the upper slider, the slide groove component is fastened to the lower slider, or the slide component is fastened to the lower slider and the slide groove component is fastened to the upper slider.

7. The terminal of claim 6, wherein the slide groove component has a slide groove, wherein the slide component is configured to slide in the slide groove, wherein the slide component is fastened to the upper slider using the slide groove when the slide component is fastened to the upper slider, and wherein the slide component is fastened to the lower slider using the slide groove when the slide component is fastened to the lower slider.

8. The terminal of claim 6, wherein the slide component is fastened to a front housing in the upper slider and the slide groove component is fastened to a rear housing in the lower slider, or wherein the slide component is fastened to the rear housing in the lower slider and the slide groove component is fastened to the front housing in the upper slider.

9. The terminal of claim 5, wherein the sliding structure does not overlap or intersect the auxiliary slide rail.

10. The terminal of claim 5, wherein the sliding structure is proximate to a bottom of the terminal and the auxiliary slide rail is proximate to a top of the terminal, or wherein the sliding structure is proximate to the top of the terminal and the auxiliary slide rail is proximate to the bottom of the terminal.

11. The terminal of claim 1, further comprising:
a first spacing between the first slide grooves and the first slide rails that are located on a same side of the upper substrate; or
a second spacing between the second slide grooves and the second slide rails that are located on a same side of the lower substrate.

12. The terminal of claim 1, wherein the first end of the upper substrate is in a position proximate to a bottom of the upper substrate, wherein the second end of the upper substrate is in a position proximate to a top of the upper substrate, wherein the first end of the lower substrate is in a position proximate to a bottom of the lower substrate, and wherein the second end of the lower substrate is in a position proximate to a top of the lower substrate.

13. The terminal of claim 1, wherein the first end of the upper substrate is in a position proximate to a top of the upper substrate, wherein the second end of the upper substrate is in a position proximate to a bottom of the upper substrate, wherein the first end of the lower substrate is in a position proximate to a top of the lower substrate, and wherein the second end of the lower substrate is in a position proximate to a bottom of the lower substrate.

14. The terminal of claim 1, wherein a first length of the first slide grooves is greater than or equal to a second length of the second slide grooves.

15. The terminal of claim 1, wherein a first length of the second slide grooves is greater than or equal to a second length of the first slide grooves.

16. The terminal of claim 1, further comprising two springs disposed symmetrically, wherein the two springs comprise a first connection end fastened to the lower substrate and a second connection end fastened to the upper substrate.

17. The terminal of claim 16, wherein the two springs are always in a compressed state.

18. The terminal of claim 16, wherein the springs are electrically conductive.

19. The terminal of claim 1, further comprising:
m spring sheets disposed on the lower substrate, wherein $m \geq 1$; and
m holes disposed on the upper substrate, wherein a first metal pad and a second metal pad are respectively disposed at two ends of each hole,
wherein the m spring sheets are configured to be in contact with the second metal pad when the upper substrate is located at a start position of sliding relative to the lower substrate, and
wherein the m spring sheets are configured to be in contact with the first metal pad when the upper substrate is located at an end position of sliding relative to the lower substrate.

20. The terminal of claim 19, wherein the m spring sheets, the first metal pad, and the second metal pad are electrically conductive.

* * * * *